Figure 1:
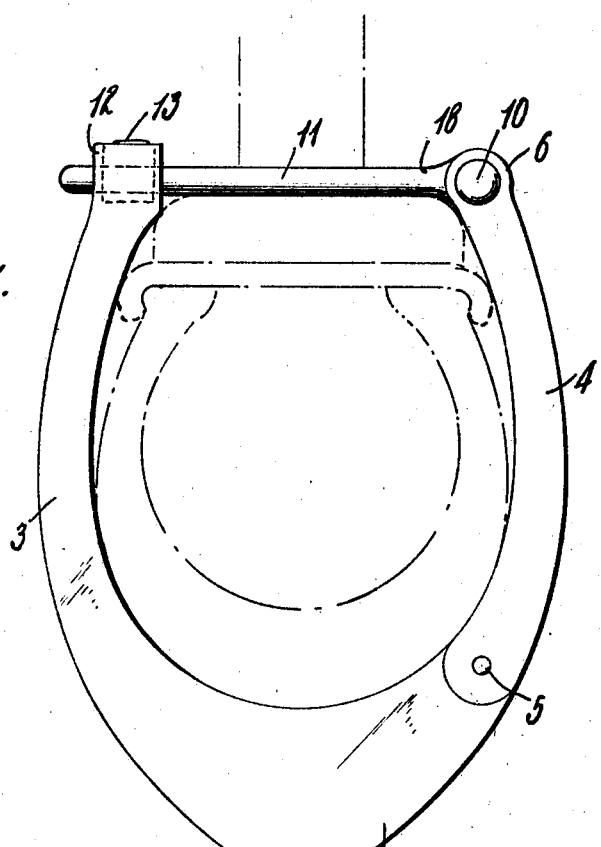

D. J. RADDICK.
WHEEL LOCK.
APPLICATION FILED MAY 13, 1920.

1,394,219.

Patented Oct. 18, 1921.

WITNESSES

INVENTOR.
David J. Raddick
BY
Richard Olwen
ATTORNEY.

UNITED STATES PATENT OFFICE.

DAVID J. RADDICK, OF SAN FRANCISCO, CALIFORNIA, ASSIGNOR OF ONE-HALF TO SIEGFRIED GRAF, OF SAN FRANCISCO, CALIFORNIA.

WHEEL-LOCK.

1,394,219.     Specification of Letters Patent.     Patented Oct. 18, 1921.

Application filed May 13, 1920. Serial No. 381,023.

*To all whom it may concern:*

Be it known that I, DAVID J. RADDICK, a citizen of the United States, residing at San Francisco, in the county of San Francisco and State of California, have invented certain new and useful Improvements in a Wheel-Lock, of which the following is a specification.

The present invention relates to a wheel lock and has reference more particularly to an anti-theft device for motor and the like vehicles, consisting primarily of a device which engages the wheel of the vehicle to realize a chocking effect for the vehicle and thus obstruct the traction of the same.

The principal object of this invention is to provide a chock or the like capable of being locked to an automobile wheel to prevent theft of the automobile and which is locked to the wheel in such a manner that it cannot be manually or otherwise turned around or twisted upon the wheel.

Another object is to render the device adjustable so that it may be used on any size wheel, and at the same time defeat any attempt to effect the above mentioned turning or twisting action.

Another object of this invention is to provide a wheel lock of simple structure and one easily and cheaply manufactured and light and of neat appearance and one easily manipulated when locking or unlocking.

With these and other objects in view, the invention will now be described in detail with reference to the accompanying drawing.

In the drawing:—

Figure 2:
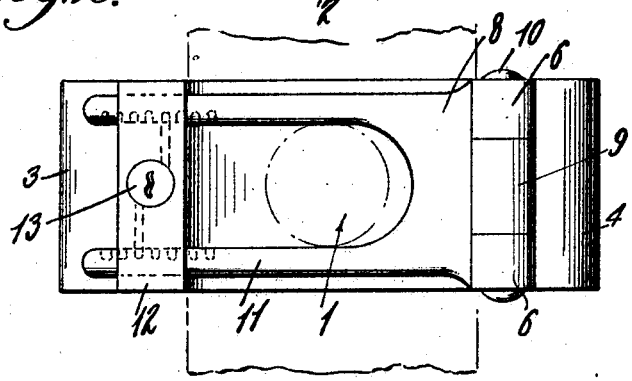

Figure 1 is a side elevation of the lock as applied to a wheel, with the wheel shown in cross section, and Fig. 2 is a top plan view.

By referring to the accompanying drawing by numerals it will be seen that my device consists of the chock 1 which is substantially V-shape so as to form the ground engaging point 2. Extending from the chock 1 is the arm 3 and it will be noted that the interior of this arm 3 and chock 1 are curved so as to be concentric with the tire indicated in dotted lines in Fig. 1. An auxiliary arm 4 may be pivotally carried upon the other end of the chock 1 by means of the pin 5 and terminates at its upper end in the two hinge members 6. This arm 4 is also curved so as to be substantially concentric with the outer periphery of the tire.

In carrying out the invention it is not necessary to pivot the arm 4 as just described, as it may be hinged or otherwise movably connected to the arm 3 with the point of connection arranged in the chock 1.

A locking frame 8 having the hinge member 9 is pivotally carried upon the upper portion of the arm 4 and between the hinge members 6 by means of the pintle or pin 10. This frame 8 is bifurcated or substantially U-shape so as to form the two arms 11 which are spaced apart sufficiently so as to receive the spoke of the automobile wheel therebetween. The upper portion of the arm 3 is provided with the head 12 which has the openings indicated by dotted lines in Figs. 1 and 2 for receiving the arms 11. A lock 13 is provided in this head 12 and may be of any preferred construction so that the arms 11 may be adjustably locked within the head 12.

From the above detailed description it will be readily seen that my wheel lock will fit tires and rims of various sizes in a snug manner whereby it will be impossible to twist same from its proper position as shown in Fig. 1. Furthermore it will be noted that the U-shape frame 8 will engage a spoke between the arms 11 thus preventing the slipping of the chock around the tire. In other words, the adjustable feature of my wheel lock will prevent all tampering therewith and thus efficiently prevent the stealing of the automobile or vehicle. Furthermore, it will be noted that even though the tire were uninflated that the chock or the whole device could only be twisted a small amount and that it would practically be impossible to effectively remove the vehicle since the tire would naturally return the locking device to its proper position as soon as the person tampering therewith released same.

While I have herein shown and described a specific and practical embodiment of my invention, it is to be understood that the showing is merely by way of illustration of the principles of the invention, and that I do not confine the invention to such illustrations except in as far as I am limited by the appended claims.

Having thus described my invention what I claim as new is:—

1. A wheel lock, comprising a chock, an arm integrally extending from one end of said chock, another arm pivoted to the other end of said chock, said integral arm having a perforated head, a U-shaped frame carried by the aforesaid pivoted arm, the side bars of said frame adapted to extend through said perforated head, and a lock carried by said perforated head.

2. In a device of the character described, a chock, a pair of arms extending from the chock adapted to fit around the rim and tire of a wheel, the chock providing a traction device on the tread surface of the tire, bifurcated means hinged to one of said arms and adapted to straddle a spoke and engage the other arm for locking the chock arms around the rim and tire at different spaced distances apart.

3. A wheel lock as set forth in claim 2, and further characterized by a lock carried at the end of the other arm adapted to coact with said bifurcated member for the purpose specified.

In testimony whereof I affix my signature in presence of two witnesses.

DAVID J. RADDICK.

Witnesses:
J. J. CORDIEU,
E. KUGELER.